United States Patent
Gambone, Jr. et al.

(10) Patent No.: US 12,330,230 B2
(45) Date of Patent: Jun. 17, 2025

(54) ADDITIVELY MANUFACTURED JOINED PARTS

(71) Applicant: General Electric Company, Schenectady, NY (US)

(72) Inventors: Justin John Gambone, Jr., Schenectady, NY (US); Thomas C. Adcock, Glenville, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 322 days.

(21) Appl. No.: 17/891,345

(22) Filed: Aug. 19, 2022

(65) Prior Publication Data

US 2024/0058889 A1    Feb. 22, 2024

(51) Int. Cl.
*B23K 20/00*    (2006.01)
*B23K 35/00*    (2006.01)
(Continued)

(52) U.S. Cl.
CPC ............ *B23K 20/00* (2013.01); *B23K 35/001* (2013.01); *B23K 35/3613* (2013.01); *C04B 37/008* (2013.01)

(58) Field of Classification Search
CPC .. B23K 20/00; B23K 35/001; B23K 35/3613; C04B 37/008; B22F 2007/066;
(Continued)

(56) References Cited

U.S. PATENT DOCUMENTS

| | | | |
|---|---|---|---|
| 6,692,597 B2 | 2/2004 | Mako et al. | |
| 9,731,377 B2 | 8/2017 | Forsdike et al. | |

(Continued)

FOREIGN PATENT DOCUMENTS

| | | |
|---|---|---|
| CA | 3104289 A1 | 12/2019 |
| DE | 102019102872 A1 | 8/2020 |

(Continued)

OTHER PUBLICATIONS

Renliang Xu et al: "Comparison of sizing small particles using different technologies", Powder Technology, Elsevier, Basel (CH), vol. 132, No. 2-3, Jun. 24, 2003 (Jun. 24, 2003), pp. 145-153, XP002711749, ISSN: 0032-5910, DOI: 10.1016/S0032-5910(03)00048-2.

(Continued)

*Primary Examiner* — Cynthia L Schaller
(74) *Attorney, Agent, or Firm* — Dinsmore & Shohl LLP

(57) ABSTRACT

A joined part comprises a first portion and a second portion. The first portion comprises a guide slot at least partially defined by a porous structure. A joint material is disposed within the porous structure. The second portion is disposed within the guide slot and contacts the porous structure and the joint material disposed therein to form an interfacial joint between the first portion and the second portion. A method of manufacturing the joined part includes disposing a joint material into a porous structure of a guide slot of a first portion, inserting a second portion into the guide slot, and contacting the porous structure and the joint material disposed therein to form an interfacial joint between the first portion and the second portion.

20 Claims, 3 Drawing Sheets

(51) Int. Cl.
*B23K 35/36* (2006.01)
*C04B 37/00* (2006.01)

(58) Field of Classification Search
CPC .... B22F 3/11; B22F 5/10; B22F 7/002; B22F 7/004; B22F 7/062; B22F 7/0645; B22F 10/28; B22F 3/1115; B33Y 10/00; B33Y 80/00; B29C 64/16
See application file for complete search history.

(56) References Cited

U.S. PATENT DOCUMENTS

| | | |
|---|---|---|
| 10,703,025 B1 | 7/2020 | Biesboer et al. |
| 2003/0138339 A1* | 7/2003 | Scancarello ........ C22C 33/0228 418/55.2 |
| 2018/0345599 A1 | 12/2018 | Bucknell et al. |
| 2019/0375014 A1 | 12/2019 | Kernan et al. |
| 2021/0078258 A1 | 3/2021 | Lalande et al. |
| 2021/0146485 A1* | 5/2021 | Bulgrin .............. B23K 35/3046 |
| 2022/0203449 A1 | 6/2022 | Hong et al. |

FOREIGN PATENT DOCUMENTS

| | | |
|---|---|---|
| EP | 2282060 A2 | 2/2011 |
| WO | 2012111854 A2 | 8/2012 |

OTHER PUBLICATIONS

Extended European Search Report for Application No. 23187148.4 dated Jan. 23, 2024 (11 pages).

* cited by examiner

ADDITIVELY MANUFACTURED JOINED PARTS

BACKGROUND

Field

The present specification relates to additive manufacturing. More specifically, the present specification is directed to additively manufactured joined parts.

Technical Background

Additive manufacturing, also known as three-dimensional (3D) printing, is a process in which material is built up layer-by-layer to form an object. The process typically includes selectively heating portions of a layer of powder of the material to melt or sinter the powder to previously-placed layers to form the object layer by layer.

Two or more additively manufactured portions may be joined to form a part. It may be desirable to join portions including thin walls (e.g., less than or equal to 1.5 mm), such as in manufacturing heat exchangers.

DETAILED DESCRIPTION

Figure 1:
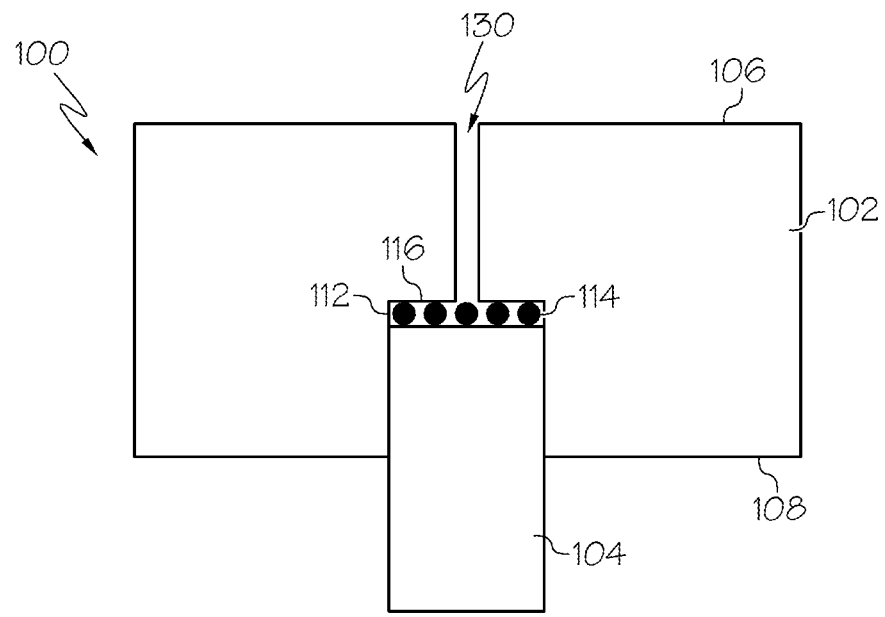
FIG. 1 is a schematic view of joined part including a first portion and a second portion, according to one or more embodiments shown and described herein.

Reference will now be made in detail to various embodiments of additively manufactured joined parts comprising a guide slot at least partially defined by a porous structure. In particular, various embodiments of joined parts include a first portion comprising a first material, a first major surface, a second major surface opposite the first major surface, and a guide slot extending from the second major surface into a thickness of the first portion, the guide slot at least partially defined by a porous structure; a joint material disposed within the porous structure; and a second portion comprising a second material, the second portion disposed within the guide slot and contacting the porous structure and the joint material disposed therein to form an interfacial joint between the first portion and the second portion. Various embodiments of the joined parts will be referred to herein with specific reference to the appended drawings.

Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply ab solute orientation.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation; and the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

The term "particle size distribution," as used herein, refers to the particle size distribution D50 or the median diameter of the particle size distribution.

The term "debinding," as used herein, refers to heating the joined part to remove at least portion of the binder.

The term "thermoplastic polymer," as used herein, refers to a polymer having one or more polymer strands having functional groups that may interact with one another via weak non-covalent forces (e.g., interactions, bonds) to link, or otherwise couple, strands of each respective thermoplastic polymer to one another.

The term "weak non-covalent forces," as used herein, refers to hydrogen bonding, ionic bonding, Van der Waals forces, and the like having a bond or force strength greater than or equal to 1 kcal/mol and less than or equal to 7 kcal/mol.

Two or more additively manufactured portions may be joined to form a part. While it may be desirable to join portions including thin walls (e.g., less than or equal to 1.5 mm), conventional joining techniques, such as welding or brazing, may result in damage to the thin walls.

Figure 2:
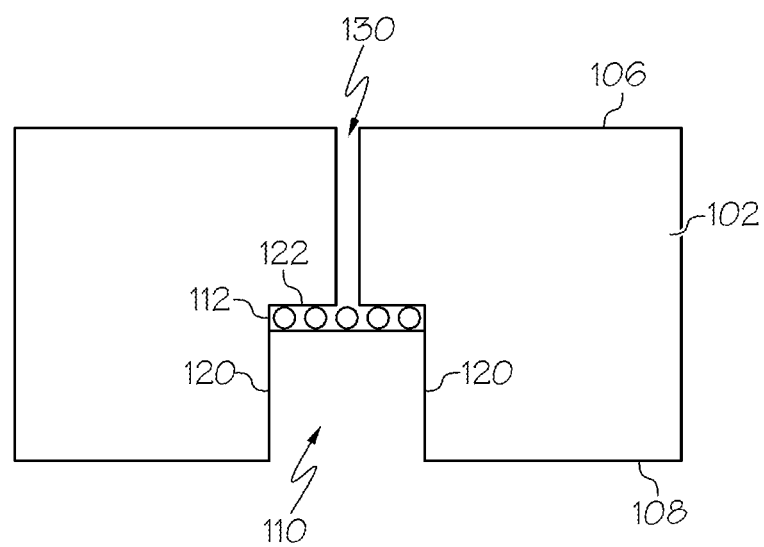
FIG. 2 is a schematic view of the first portion of FIG. 1.

As set forth above and referring to FIGS. 1 and 2, a joined part 100 described herein comprises a first portion 102 comprising a first material and a second portion 104 comprising a second material. The first portion 102 comprises a first major surface 106 and a second major surface 108 opposite the first major surface 106. The first portion 102 includes a guide slot 110 extending from the second major surface 108, into a thickness of the first portion 102. The guide slot 110 is at least partially defined by a porous structure 112. For example, in embodiments, as described herein, the porous structure 112 may be formed during manufacturing of the first portion 102 or may be disposed on a surface of the guide slot 110 after the first portion 102 is manufactured. A joint material 114 is disposed within the porous structure 112. The second portion 104 is disposed within the guide slot 110 and contacts the porous structure 112 and the joint material 114 disposed therein. This forms an interfacial joint 116 between the first portion 102 and the second portion 104 and holds the second portion 104 in place to form a joined part 100 while minimizing or eliminating damage to the portions 102, 104 prior to sintering.

Figure 3:
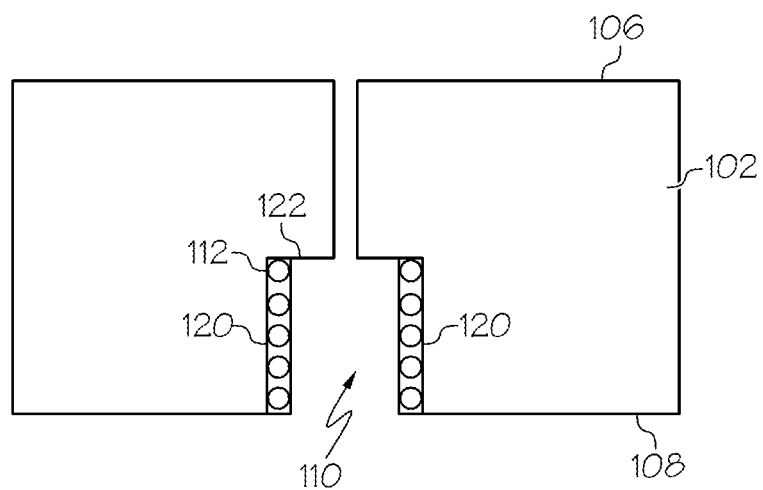
FIG. 3 is a schematic view of another embodiment of a first portion, according to one or more embodiments shown and described herein.

The guide slot 110 structurally holds the second portion 104 of the joined part 100 in place. In embodiments, the guide slot 110 may comprise a pair of sidewalls 120 perpendicular to the second major surface 108 and a bottom wall 122 parallel to the second major surface 108. While the guide slot 110 shown in FIGS. 1-3 is generally rectangular in shape, one skilled in the art should appreciate that the guide slot 110 may be any shape that allows for aligning between the portions 102, 104, holding of the second portion 104 in place prior to sintering, and sufficient contact between the portions 102, 104 during joining. For example, in embodiments, residual stresses of the structure of the guide slot 110 may relax during heating to form the joined part, causing the guide slot 110 to clamp and conform to the second portion 104. In other embodiments, the guide slot 110 may include mechanical clipping or locking features (not shown).

Figure 4:
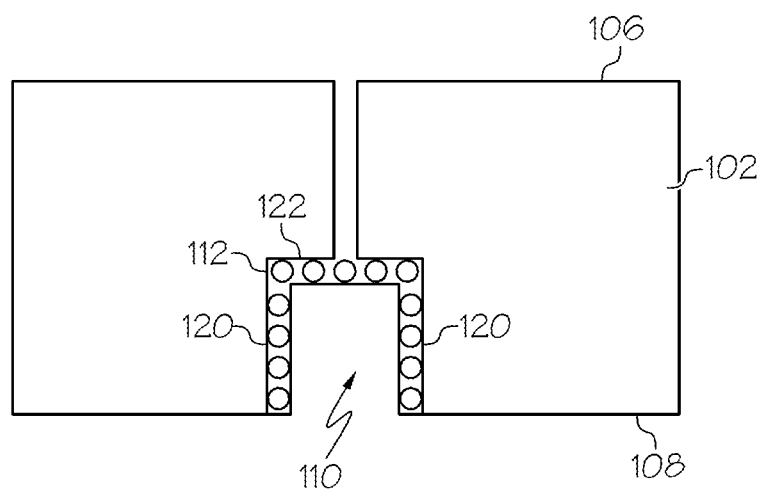
FIG. 4 is a schematic view of another embodiment of a first portion, according to one or more embodiments shown and described herein.

In embodiments, as shown in FIG. 2, the bottom wall 122 of the guide slot 110 may comprise the porous structure 112. Referring now to FIG. 3, in embodiments, at least one of the pair of sidewalls 120 of the guide slot 110 may comprise the porous structure 112. Although as illustrated both sidewalls 120 comprise the porous structure 112, as previously stated, an embodiment may include only one of the pair of sidewalls 120 comprising the porous structure 112. Referring now to FIG. 4, both the bottom wall 122 and at least one of the pair of sidewalls 120 of the guide slot 110 may comprise the porous structure 112.

Figure 5:
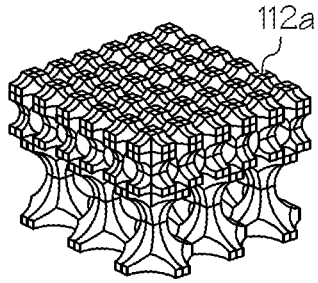
FIG. 5 is a perspective view of a porous structure, according to one or more embodiments shown and described herein.
Figure 6:
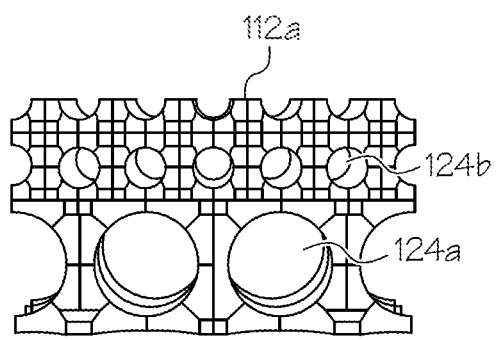
FIG. 6 is another view of the porous structure of FIG. 5.

The porous structure 112 (FIG. 1) may include various porous structures that draw in and retain the joint material 114 (FIG. 1), such as the wick structures described in U.S. Pat. No. 10,356,945 B2, which is incorporated herein by reference in its entirety. For example, referring now to FIGS. 5 and 6, exemplary configurations of a porous structure is shown at 112a. Specifically, FIG. 5 shows a non-uniform porous structure 112a in a thickness direction (z-direction). FIG. 6 shows the non-uniform porous structure 112a includes pores 124a, 124b. The pores 124a, 124b in this example are round or curved spaces. In addition to or as an alternative to the non-uniform structures shown in FIGS. 5 and 6, the porous structure 112 may include a uniform structure.

In embodiments, the pore size of the pores 124a, 124b may be adjusted in relation to a particle size of a powder of the joint material 114. For example, a minimum pore size may be the minimum particle size of the powder of the joint material 114 (FIG. 1). The maximum pore size may be a pore size that no longer effectively retains the joint material 114. In embodiments, the porous structure 112 may include a pore gradient, with pore size decreasing in a direction away from the guide slot 110 (FIG. 2).

As described herein, the guide slot 110 and the joint material 114 disposed in the porous structure 112 of the guide slot 110 hold the second portion 104 in place, allowing for joining of portions having relatively thin walls (e.g., less than or equal to 1.5 mm) while minimizing or eliminating the damage thereto. In embodiments, a thickness of the first portion 102 from the first major surface 106 to the second major surface 108, prior to joining with the second portion 104, may be less than or equal 1.5 mm, less than or equal to 1.25 mm, or even less than or equal to 1.0 mm. In embodiments, a thickness of the first portion may be greater than or equal to 0.1 mm, 0.25 mm, or even greater than or equal to 0.5 mm. In embodiments, a thickness of the first portion 102 may be greater than or equal to 0.1 mm and less than or equal to 1.5 mm, greater than or equal to 0.1 mm and less than or equal to 1.25 mm, greater than or equal to 0.1 mm and less than or equal to 1.0 mm, greater than or equal to 0.25 mm and less than or equal to 1.5 mm, greater than or equal to 0.25 mm and less than or equal to 1.25 mm, greater than or equal to 0.25 mm and less than or equal to 1.0 mm, greater than or equal to 0.5 mm and less than or equal to 1.5 mm, greater than or equal to 0.5 mm and less than or equal to 1.25 mm, or even greater than or equal to 0.5 mm and less than or equal to 1.0 mm, or any and all sub-ranges formed from any of these endpoints.

Referring back to FIGS. 1 and 2, in embodiments, the first portion 102 may comprise a passage 130 extending from the first major surface 106 into the thickness of the first portion 102 to the guide slot 110. The passage 130 may allow for delivery of the joint material 114 to the porous structure 112.

The joint material 114 holds the second portion 104 in place via mechanical friction and/or weak non-covalent forces. In embodiments, the joint material 114 may comprise a powder having a particle having a particle size distribution greater than or equal to 0.1 $\mu$m and less than or equal to 50 $\mu$m such that the joint material 114 is adequately wicked into the porous structure 112 (e.g., by capillary action) and fills and is retained in the porous structure 112 (e.g., via surface tension) prior to sintering the joined part 100. In embodiments, the powder may have a particle size distribution greater than or equal to 0.1 $\mu$m, greater than or equal to 0.5 $\mu$m, greater than or equal to 1 $\mu$m, greater than or equal to 5 $\mu$m, greater than or equal to 10 $\mu$m, or even greater than or equal to 20 $\mu$m. In embodiments, the powder may have a particle size distribution less than or equal to 50 $\mu$m, less than or equal to 45 $\mu$m, or even less than or equal to 40 $\mu$m. In embodiments, the powder may have a particle size distribution greater than or equal to 0.1 $\mu$m and less than or equal to 50 $\mu$m, greater than or equal to 0.1 $\mu$m and less than or equal to 45 $\mu$m, greater than or equal to 0.1 $\mu$m and less than or equal to 40 $\mu$m, greater than or equal to 0.5 $\mu$m and less than or equal to 50 $\mu$m, greater than or equal to 0.5 $\mu$m and less than or equal to 45 $\mu$m, greater than or equal to 0.5 $\mu$m and less than or equal to 40 $\mu$m, greater than or equal to 1 $\mu$m and less than or equal to 50 $\mu$m, greater than or equal to 1 $\mu$m and less than or equal to 45 $\mu$m, greater than or equal to 1 $\mu$m and less than or equal to 40 $\mu$m, greater than or equal to 5 $\mu$m and less than or equal to 50 $\mu$m, greater than or equal to 5 $\mu$m and less than or equal to 45 $\mu$m, greater than or equal to 5 $\mu$m and less than or equal to 40 $\mu$m, greater than or equal to 10 $\mu$m and less than or equal to 50 $\mu$m, greater than or equal to 10 $\mu$m and less than or equal to 45 $\mu$m, greater than or equal to 10 $\mu$m and less than or equal to 40 $\mu$m, greater than or equal to 20 $\mu$m and less than or equal to 50 $\mu$m, greater than or equal to 20 $\mu$m and less than or equal to 45 $\mu$m, or even greater than or equal to 20 $\mu$m and less than or equal to 40 $\mu$m, or any and all sub-ranges formed from any of these endpoints.

In embodiments, the joint material 114 may vary depending on the materials of the first and second portions 102, 104 and the end use of the joined part 100. In embodiments, the powder of the joint material 114 may comprise at least one constituent component in common with at least one of a material of the first portion 102 and a material of the second portion 104. In embodiments, the constituent components may comprise a metallic component, a metal oxide, or a combination thereof.

In embodiments, the powder of the joint material 114 may comprise a metallic powder. In embodiments, the metallic powder may comprise nickel alloy (e.g., Inconel 625, Rene' 108, Rene' 80), stainless steel alloy (e.g., 316L, 17-4PH), cobalt-chromium alloy, aluminum alloy (e.g., A16061), iron alloy, titanium alloy (e.g., Ti64), copper alloy, copper nickel alloy (e.g., C18000), or a combination thereof. In other embodiments, the powder of the joint material 114 may comprise a ceramic powder. In embodiments, the ceramic powder may comprise alumina, aluminum nitride, zirconia, titania, silica, silicon nitride, silicon carbide, boron nitride, or a combination thereof.

In embodiments, joint material 114 may further comprise a binder. The binder may impart strength to the joined part 100 by binding the powder of the joint material 114 and the first and/or second portions 102, 104 together after a curing step in which some or all of the solvent of the binder is evaporated. Suitable binders include, but are not limited to, thermoplastic binders, thermoset binders, and non-polymeric binders such as waxes and sugars (e.g., glucose, fructose, derivatives thereof, or a combination thereof). For exemplary purposes, a thermoplastic binder is described in further detail below. However, one skilled in the art should appreciate that any binder that imparts strength may be used.

In embodiments, the binder may comprise a thermoplastic binder comprising one or more thermoplastic polymer strands. In embodiments, the thermoplastic binder may be selected from a class of thermoplastic polymers that generally decompose into small oligomers, carbon dioxide and water without requiring the presence of oxygen. Accordingly, in embodiments, the thermoplastic binder may be cleanly and readily removed during debinding and sintering to generate a consolidated part that is substantially free of the thermoplastic binder and decomposition products (e.g., char and metal oxides).

In embodiments, the one or more thermoplastic polymer strands may include a first polymer strand. In embodiments, the first polymer strand may include at least a first functional group. Functional groups of the first thermoplastic polymer strand may include, by way of example and not limitation, hydrogen bond donors, hydrogen bond acceptors, negatively charged groups, positively charged groups, or combinations thereof. In embodiments, the first functional group may be part of the backbone of the first thermoplastic polymer strand. In embodiments, the first functional group of the first polymer strand may compliment a functional group of a second polymer strand of the thermoplastic binder to facilitate non-covalent coupling of the first and second polymer strands. For example, in embodiments, the first functional group may be selected from hydroxyl groups, carboxylate groups, amine, thiol, amide, or other suitable functional groups that enable weak, non-covalent coupling of the first and second polymer strands.

In embodiments, the first polymer strand may include one or more polymers such as, but not limited to, polyvinyl alcohol (PVA), polyacrylamide (PAAm), polyacrylic acid (PAA), polyvinyl pyrrolidone (PVP), polymethyl methacrylate (PMMA), polyvinyl methyl ether-maleic anhydride (PVME-MA), polystyrene (PS), derivatives thereof, and combinations thereof. In embodiments, the first polymer strand may have an average molecular weight (Mw or weight average) greater than 7,000 g/mol to 50,000 g/mol. In embodiments, the first polymer strand may have an average molecular weight greater than or equal to 7,000 g/mol and less than or equal to 50,000 g/mol. For example, the first polymer strand may have an average molecular weight greater than or equal to 7,000 g/mol and less than or equal to 50,000 g/mol, greater than or equal to 7,000 g/mol and less than or equal to 30,000 g/mol, greater than or equal to 7,000 g/mol and less than or equal to 25,000 g/mol, greater than or equal to 7,000 g/mol and less than or equal to 23,000 g/mol, greater than or equal to 9,000 g/mol and less than or equal to 50,000 g/mol, greater than or equal to 9,000 g/mol and less than or equal to 30,000 g/mol, greater than or equal to 9,000 g/mol and less than or equal to 25,000 g/mol, greater than or equal to 9,000 g/mol and less than or equal to 23,000 g/mol, greater than or equal to 13,000 g/mol and less than or equal to 50,000 g/mol, greater than or equal to 13,000 g/mol and less than or equal to 30,000 g/mol, greater than or equal to 13,000 g/mol and less than or equal to 25,000 g/mol, greater than or equal to 13,000 g/mol and less than or equal to 23,000 g/mol, greater than or equal to 23,000 and less than or equal to 50,000 g/mol, greater than or equal to 23,000 g/mol and less than or equal to 30,000 g/mol, greater than or equal to 23,000 g/mol and less than or equal to 25,000 g/mol, greater than or equal to 25,000 g/mol and less than or equal to 50,000 g/mol, greater than or equal to 25,000 g/mol and less than or equal to 30,000 g/mol, or even greater than or equal to 30,000 g/mol and less than or equal to 50,000 g/mol, or any and all sub-ranges formed from any of these endpoints.

In embodiments, the one or more thermoplastic polymer strands may further include a second polymer strand. In embodiments, the second polymer strand may include at least a second functional group different from the first functional group of the first polymer strand. Functional groups of the second thermoplastic polymer strand may include, by way of example and not limitation, hydrogen bond donors, hydrogen bond acceptors, negatively charged groups, positively charged groups, or combinations thereof. In embodiments, the second functional group is part of the backbone of the second thermoplastic polymer strand. In embodiments, the second functional group of the second polymer strand may compliment the first functional group of the first polymer strand of the thermoplastic binder to facilitate non-covalent coupling of the first and second polymer strands. For example, in embodiments, the second functional group may be selected from hydroxyl groups, carboxylate groups, amine, thiol, amide, or other suitable functional groups that enable weak, non-covalent coupling of the first and second polymer strands.

In embodiments, the second polymer strand may include one or more polymers such as, but not limited to, polyacrylic acid (PAA), poly methacrylic acid (PmAA), polyacrylamide (PAAm), derivatives thereof, and combinations thereof. In embodiments, the second polymer strand may have an average molecular weight (Mw or weight average) greater than or equal to 100 g/mol and less than or equal to 10,000 g/mol. For example, the second polymer strand may have an average molecular weight greater than or equal to 100 g/mol and less than or equal to 10,000 g/mol, greater than or equal to 100 g/mol and less than or equal to 5,000 g/mol, greater than or equal to 500 g/mol and less than or equal to 10,000 g/mol, or even greater than or equal to 500 g/mol and less than or equal to 5,000 g/mol, or any and all sub-ranges formed from any of these endpoints.

In embodiments, the joint material 114 may further include at least one solvent. The solvent may be aqueous or non-aqueous depending on the selected thermoplastic binder and other additives that may be in the joint material 114. The solvent may be generally non-reactive (e.g., inert) such that it does not react with the particulate material, the thermoplastic binder, or any other additives that may be in the joint material 114. In embodiments, at least a portion of the solvent may readily evaporate during deposition of the joint material 114 within the porous structure 112, prior to thermal curing, and facilitate bonding of the joint material 114 and the portions 102, 104. In embodiments, the solvent may be, by way of example and not limitation, water, 2-methoxy ethanol, butanol, 1-methoxy-2-propanol, 2-butoxy ethanol, ethylene glycol, ethylene glycol butyl ether, diethylene glycol, tetrahydrofuran (THF), methyl ethyl ketone (MEK), or combinations thereof.

Figure 7:
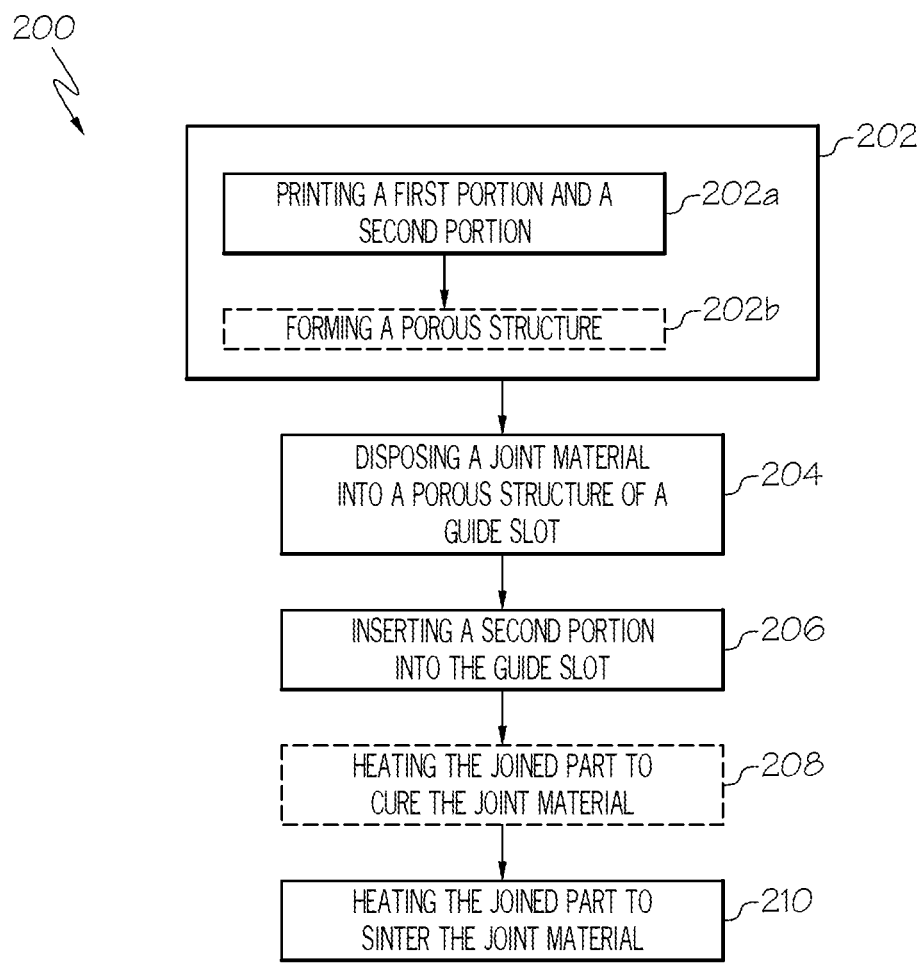
FIG. 7 is a flow diagram of an embodiment of a method of manufacturing a joined part according to one or more embodiments shown and described herein.

Referring now to FIG. 7, a method of manufacturing a joined part via additive manufacturing using a guide slot at least partially defined by a porous structure according to embodiments described herein is shown at 200. The method begins at block 202 with providing a first portion 102 and a second portion 104 as shown in FIGS. 1 and 2. The first and second portions 102, 104 may be provided by any method known to one of ordinary skill in the art.

For example, the block 202 of providing a first portion 102 and a second portion 104 may begin at block 202a with printing the first portion 102 and the second portion 104. The first portion 102 and the second portion 104 may be printed according to any suitable method known in the art, such as direct metal laser sintering (DMLS), electron beam melting (EBM), or combinations thereof as described in U.S. Pat. No. 10,773,310, which is incorporated by reference herein in its entirety.

In particular, at least one of the first material of the first portion 102 and the second material of the second portion 104 may include a metal particulate material, such as a nickel alloy (e.g., Inconel 625, Inconel 718, Rene'108, Rene' 80, Rene' 142, Rene' 195, and Rene'M2, Marm-247), a cobalt alloy (e.g., Hans 188, L605, X40, X45, and FSX414), a cobalt-chromium alloy, a titanium alloy, an aluminum alloy, a tungsten alloy, a stainless steel alloy (e.g., SS316L, S S304, Alloy Steel 8620, Alloy Steel 4140, Alloy 17-4PH, Stainless Steel 300 Series, Stainless Steel 400 Series), a low carbon steel (i.e., steel having a carbon content from 0.05% to 0.3%), copper, or a combination thereof.

In embodiments, at least one of the first material of the first portion 102 and the second material of the second portion 104 may include a ceramic particulate material, such as alumina, aluminum nitride, zirconia, titania, silica, silicon nitride, silicon carbide, boron nitride, or a combination thereof.

In embodiments, the porous structure 112 is formed in the guide slot 110 of the first portion 102 during the additive manufacturing process of the first portion 102. In other embodiments, as shown in FIG. 7, block 202 may further include block 202b of forming a porous structure. The porous structure 112 may be formed may any suitable method, such as by precision sintering deposited build powder particles as described in U.S. Pat. No. 10,356,945 B2, which, as stated above, is incorporated herein by reference in its entirety. For example, independently creating a precision sintered porous structure of the guide slot may include sintering a first collection of build powder particles from each of a first group of layers from the number of layers of build powder particles to create pores. Specifically, sintering a first collection of build powder particles from each of a first group of layers from the number of build powder particles includes sintering by applying a first predetermined laser spot input power corresponding to a first combination of laser parameters. The first combination of laser parameters include at least one of: input powder value, laser spot size, laser velocity, hatch spacing, build layer thickness, build powder particle size, and build powder distribution.

Independently creating a precision sintered porous structure of the guide slot also includes melting a second collection of build powder particles from each of a second group of layers from the number of layers of build powder particles to create consolidated (i.e., non-porous) portions. Specifically, melting a second collection of build powder particles from each of a second group of layers from the number of layers of build powder particles includes melting by applying a second predetermined laser spot input powder corresponding to a second combination of laser parameters. The second combination of laser parameters includes at least one of: input powder value, laser spot size, laser velocity, hatch spacing, build layer thickness, build powder particle size, and build powder distribution.

Following printing of the first portion 102 and the second portion 104, the method 200 of FIG. 7 continues at block 204 with disposing a joint material 114 into the porous structure 112 of the guide slot 110 of the first portion 102 as shown in FIG. 2. In embodiments, the joint material 114 may be drawn into the porous structure 112 by capillary action and retained within the porous structure 112 via surface tension. The joint material 114 may be disposed into the porous structure 112 using any method known to one of ordinary skill in the art. In embodiments in which the first portion 102 comprises a passage 130 (FIG. 1), the step of disposing the joint material 114 into the porous structure 112 may comprise inserting the joint material 114 into the passage 130 such that the joint material 114 is drawn into the porous structure 112 by capillary action and contained within the porous structure 112 via surface tension.

The method 200 of FIG. 7 continues at block 206 with inserting the second portion 104 into the guide slot 110 and contacting the porous structure 112 and the joint material 114 disposed thereinto form an interfacial joint 116 between the first portion 102 and the second portion 104 and forming the joined part 100. The guide slot 110 and the joint material 114 hold the second portion 104 in place (e.g., prior to sintering), which reduces or eliminates damage to the first and second portions 102, 104 thereof.

The method 200 of FIG. 7 may optionally continue at block 208 with heating the joined part 100 at a first temperature to cure the joint material 114. During curing, any solvent present in the joint material 114 may be evaporated and any monomers present in the joint material 114 may be crosslinked to impart strength to the joined part 100. In embodiments, the method 200 does not include a curing step because the joint material 114 does not include a solvent and/or the guide slot 110 and the joint material 114 disposed within the porous structure 112 may sufficiently hold the second portion 104 in place prior to sintering.

In embodiments, heat is applied to the joined part 100 using an IR lamp and/or heated plate (e.g., on-machine), or curing may be carried out by placing the joined part 100 in an oven (e.g., off-machine). In embodiments, to cure the joint material 114, the joined part 100 may be heated at a first temperature greater than or equal to 65° C. and less than or equal to 140° C., greater than or equal to 65° C. and less than or equal to 125° C., greater than or equal to 65° C. and less than or equal to 110° C., greater than or equal to 80° C. and less than or equal to 140° C., greater than or equal to 80° C. and less than or equal to 125° C., or even greater than or equal to 80° C. and less than or equal to 110° C., or any and all sub-ranges formed from any of these endpoints.

The method 200 of FIG. 7 continues at block 210 with heating the joined part 100 at a second temperature to sinter the joint material 114, which consolidates the joined part 100. During sintering, the joint material 114 sinters with the first portion 102, the second portion 104, and itself.

In embodiments, the joint material 114 has a melting point T M and the second temperature of block 210 may be greater than or equal to 0.5 $T_M$ and less than or equal to 0.9 $T_M$, greater than or equal to 0.5 $T_M$ and less than or equal to 0.8 $T_M$, greater than or equal to 0.5 $T_M$, and less than or equal to 0.7 $T_M$, greater than or equal to 0.6 $T_M$ and less than or equal to 0.9 $T_M$, greater than or equal to 0.6 $T_M$ and less than or equal to 0.8 $T_M$, or even greater than or equal to 0.6 $T_M$, and less than or equal to 0.7 $T_M$, or any and all subranges formed from any of these endpoints.

In embodiments, heating the joined part 100 above the second temperature may include heating the joined part in an oxygen-free environment (e.g., in a vacuum chamber/under inert atmosphere) or in air.

In embodiments, blocks 208 and 210 may occur in a single step (e.g., place joined part in an oven).

Although various embodiments described herein are described with reference to method 200, it should be understood that embodiments of the joined part described herein may be used with a variety of methods that are known and used by those skilled in the art. In particular, forming the first portion 102 and the second portion 104 may be accomplished in a number of different ways, in a number of different steps, and in a number of different locations.

As described herein, various embodiments of portions include a guide slot and a porous structure with joint material disposed therein, which hold a second portion disposed in the guide slot in place to form a joined part while reducing or eliminating damage to the portions thereof.

Further aspects of the invention are provided by the subject matter of the following clauses:

A joined part comprising: a first portion comprising a first material, a first major surface, a second major surface opposite the first major surface, and a guide slot extending from the second major surface into a thickness of the first portion, the guide slot at least partially defined by a porous structure; a joint material disposed within the porous structure; and a second portion comprising a second material, the second portion disposed within the guide slot and contacting the porous structure and the joint material disposed therein to form an interfacial joint between the first portion and the second portion.

The joined part of any preceding clause, wherein the guide slot comprises a pair of sidewalls perpendicular to the second major surface and a bottom wall parallel to the second major surface.

The joined part of any preceding clause, wherein the bottom wall of the guide slot comprises the porous structure.

The joined part of any preceding clause, wherein at least one of the sidewalls of the guide slot comprises the porous structure.

The joined part of any preceding clause, wherein the first portion further comprises a passage extending from the first major surface into the thickness of the first portion to the guide slot.

The joined part of any preceding clause, wherein the thickness of the first portion is less than or equal to 1.5 mm.

The joined part of any preceding clause, wherein the joint material comprises a powder having a particle size distribution greater than or equal to 0.1 μm and less than or equal to 50 μm.

The joined part of any preceding clause, wherein the powder comprises at least one constituent component in common with at least one of the first material and the second material.

The joined part of any preceding clause, wherein constituent component comprises a metallic element, a metal oxide, or a combination thereof.

The joined part of any preceding clause, wherein at least one of the first material and the second material comprises a metallic material, the metallic material comprising a nickel alloy, a cobalt alloy, a cobalt-chromium alloy, a titanium alloy, an aluminum-based alloy, a tungsten alloy, a stainless steel alloy, low carbon steel, copper, or a combination thereof.

The joined part of any preceding clause, wherein at least one of the first material and the second material comprises a ceramic material, the ceramic material comprising alumina, aluminum nitride, zirconia, titania, silica, silicon nitride, silicon carbide, boron nitride, or a combination thereof.

The joined part of any preceding clause, wherein the joint material further comprises a thermoplastic binder.

The joined part of any preceding clause, wherein the thermoplastic binder comprises a first polymer strand, the first polymer strand comprising polyvinyl alcohol (PVA), polyacrylamide (PAAm), polyacrylic acid (PAA), polyvinyl pyrrolidone (PVP), polymethyl methacrylate (PMMA), polyvinyl methyl ether-maleic anhydride (PVME-MA), polystyrene (PS), derivatives thereof, or combinations thereof.

A method of manufacturing a joined part, the method comprising: disposing a joint material into a porous structure of a guide slot of a first portion, the first portion comprising a first material, a first major surface, and a second major surface, the guide slot extending from the second major surface into a thickness of the first portion; and inserting a second portion comprising a second material into the guide slot and contacting the porous structure and the joint material disposed therein to form an interfacial joint between the first portion and the second portion.

The method of any preceding clause, wherein the joint material is drawn into the porous structure by capillary action and retained within the porous structure via surface tension.

The method of any preceding clause, wherein the thickness of the first portion is less than or equal to 1.5 mm.

The method of any preceding clause, wherein the joint material comprises a powder having a particle size distribution greater than or equal to 0.1 μm and less than or equal to 50 μm.

The method of any preceding clause, wherein: the first portion further comprises a passage extending from the first major surface into the thickness of the first portion to the guide slot; and the step of disposing the joint material into the porous structure comprises inserting the joint material into the passage such that the joint material is drawn into the porous structure by capillary action and contained within the porous structure via surface tension.

The method of any preceding clause, wherein the method further comprises heating the joined part at a first temperature greater than or equal to 65° C. and less than or equal to 140° C. to cure the joint material.

The method of any preceding clause, wherein the joint material has a melting point T M and the method further comprises heating the joined part at a second temperature greater than or equal to 0.5 $T_M$ and less than or equal to 0.9 $T_M$ to sinter the joint material.

The above embodiments, and the features of those embodiments, are exemplary and can be provided alone or in any combination with any one or more features of other embodiments provided herein without departing from the scope of the disclosure.

It will be apparent to those skilled in the art that various modifications and variations can be made to the present disclosure without departing from the scope of the disclosure. Thus, it is intended that the present disclosure cover the modifications and variations of this disclosure provided they come within the scope of the appended claims and their equivalents.

What is claimed is:

1. A joined part comprising:
   a first portion comprising a first material, a first major surface, a second major surface opposite the first major surface, and a guide slot extending from the second major surface into a thickness of the first portion, the guide slot at least partially defined by a porous structure comprising a plurality of pores;
   a joint material disposed within the plurality of pores of the porous structure; and
   a second portion comprising a second material, the second portion disposed within the guide slot and contacting the porous structure and the joint material disposed therein to form an interfacial joint between the first portion and the second portion.

2. The joined part of claim 1, wherein the guide slot comprises a pair of sidewalls perpendicular to the second major surface and a bottom wall parallel to the second major surface.

3. The joined part of claim 2, wherein the bottom wall of the guide slot comprises the porous structure.

4. The joined part of claim 2, wherein at least one of the sidewalls of the guide slot comprises the porous structure.

5. The joined part of claim 1, wherein the first portion further comprises a passage extending from the first major surface into the thickness of the first portion to the guide slot.

6. The joined part of claim 1, wherein the thickness of the first portion is less than or equal to 1.5 mm.

7. The joined part of claim 1, wherein the joint material comprises a powder having a particle size distribution greater than or equal to 0.1 µm and less than or equal to 50 µm.

8. The joined part of claim 7, wherein the powder comprises at least one constituent component in common with at least one of the first material and the second material.

9. The joined part of claim 8, wherein the at least one constituent component comprises a metallic element, a metal oxide, or a combination thereof.

10. The joined part of claim 1, wherein at least one of the first material and the second material comprises a metallic material, the metallic material comprising a nickel alloy, a cobalt alloy, a cobalt-chromium alloy, a titanium alloy, an aluminum-based alloy, a tungsten alloy, a stainless steel alloy, low carbon steel, copper, or a combination thereof.

11. The joined part of claim 1, wherein at least one of the first material and the second material comprises a ceramic material, the ceramic material comprising alumina, aluminum nitride, zirconia, titania, silica, silicon nitride, silicon carbide, boron nitride, or a combination thereof.

12. The joined part of claim 1, wherein the joint material further comprises a thermoplastic binder.

13. The joined part of claim 12, wherein the thermoplastic binder comprises a first polymer strand, the first polymer strand comprising polyvinyl alcohol (PVA), polyacrylamide (PAAm), polyacrylic acid (PAA), polyvinyl pyrrolidone (PVP), polymethyl methacrylate (PMMA), polyvinyl methyl ether-maleic anhydride (PVME-MA), polystyrene (PS), derivatives thereof, or combinations thereof.

14. A method of manufacturing a joined part, the method comprising:
   disposing a joint material into a porous structure comprising a plurality of pores of a guide slot of a first portion, the first portion comprising a first material, a first major surface, and a second major surface, the guide slot extending from the second major surface into a thickness of the first portion; and
   inserting a second portion comprising a second material into the guide slot and contacting the porous structure and the joint material disposed therein, to form an interfacial joint between the first portion and the second portion.

15. The method of claim 14, wherein the joint material is drawn into the porous structure by capillary action and retained within the porous structure via surface tension.

16. The method of claim 14, wherein the thickness of the first portion is less than or equal to 1.5 mm.

17. The method of claim 14, wherein the joint material comprises a powder having a particle size distribution greater than or equal to 0.1 µm and less than or equal to 50 µm.

18. The method of claim 14, wherein:
   the first portion further comprises a passage extending from the first major surface into the thickness of the first portion to the guide slot; and
   the step of disposing the joint material into the porous structure comprises inserting the joint material into the passage such that the joint material is drawn into the porous structure by capillary action and contained within the porous structure via surface tension.

19. The method of claim 14, wherein the method further comprises heating the joined part at a first temperature greater than or equal to 65° C. and less than or equal to 140° C. to cure the joint material.

20. The method of claim 14, wherein the joint material has a melting point TM and the method further comprises heating the joined part at a second temperature greater than or equal to 0.5 TM and less than or equal to 0.9 TM to sinter the joint material.

* * * * *